Figure 1:
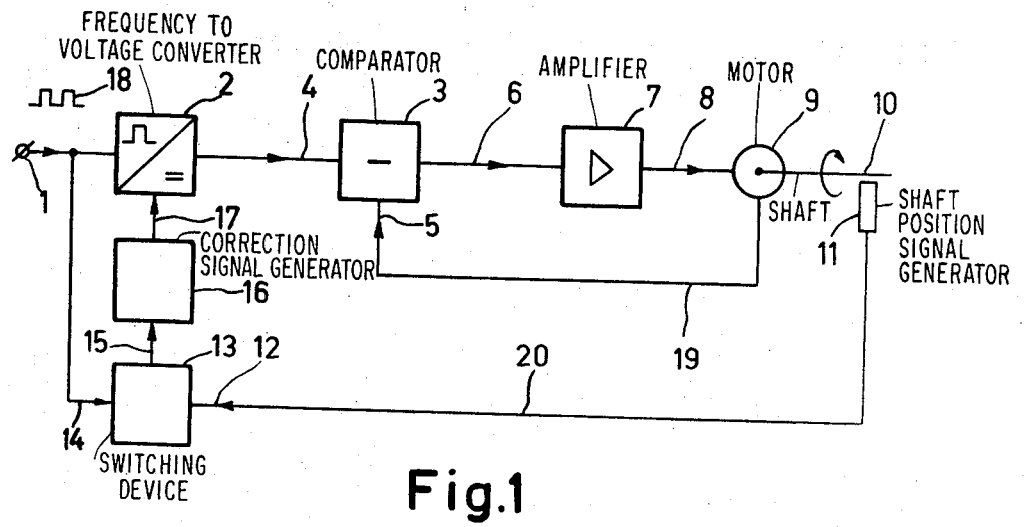

United States Patent [19]
Korteling

[11] 3,778,693

[45] Dec. 11, 1973

[54] PULSE-TO-REVOLUTION CONVERTER FOR CONVERTING A VARIABLE PULSE FREQUENCY INTO A PROPORTIONAL ROTATION SPEED OF A SHAFT

[75] Inventor: Aart Gerrit Korteling, Emmasingel, Eindhoven, Netherlands

[73] Assignee: U.S. Philips Corporation, New York, N.Y.

[22] Filed: Aug. 30, 1972

[21] Appl. No.: 285,024

[30] Foreign Application Priority Data
Sept. 6, 1971 Netherlands .................... 7112272

[52] U.S. Cl. .............................. 318/314, 318/326
[51] Int. Cl. ............................................. H02p 5/16
[58] Field of Search ................ 318/314, 318, 326, 318/327, 345

[56] References Cited
UNITED STATES PATENTS

| | | |
|---|---|---|
| 3,008,075 | 11/1961 | Scott................................. 318/314 |
| 3,500,160 | 3/1970 | Sommer......................... 318/318 X |
| 3,656,041 | 4/1972 | Bonzano ............................ 318/318 |
| 3,241,023 | 3/1966 | Eby.................................... 318/314 |
| 3,331,006 | 7/1967 | Strand et al. ..................... 318/314 |
| 3,424,966 | 1/1969 | Webb................................. 318/314 |
| 3,522,503 | 8/1970 | Feulner............................. 318/314 |
| 3,577,056 | 5/1971 | Tsujikawa......................... 318/314 |

Primary Examiner—A. D. Pellinen
Attorney—Frank R. Trifari

[57] ABSTRACT

By providing a conventional pulse-to-revolution converter comprising a motor control circuit and a tacho signal negative-feedback loop with an additional negative-feedback loop an exact ratio is obtainable between the variable pulse repetition frequency of a pulse train and the rotation speed of a rotating shaft coupled to the motor. The shaft carries a shaft position pick-up which via a switching device operates a correction signal source.

5 Claims, 2 Drawing Figures

PULSE-TO-REVOLUTION CONVERTER FOR CONVERTING A VARIABLE PULSE FREQUENCY INTO A PROPORTIONAL ROTATION SPEED OF A SHAFT

The invention relates to a pulse-to-revolution converter for converting a variable pulse frequency into a proportional speed of rotation of an output shaft, which converter comprises a pulse frequency-to-voltage converter which feeds a supply circuit for a motor which is provided with tacho-signal negative feedback and the rotor of which is coupled to the output shaft.

In control technology it is known to feed a motor via an amplifier and to derive from the motor a tacho-signal which is a measure of the speed of the motor and to return this signal as a negative-feedback signal to the amplifier, resulting in a motor speed which is substantially proportional to the input voltage for the amplifier. This principle is used in some record players.

If the quantity to be converted is not the amplitude of an input voltage but the frequency of an alternating voltage or a pulse train, in some cases synchronous motors or stepping motors may be used. However, when the frequency range is too large or the frequencies are too high, these motors either cannot be used or can only be used in conjunction with complicated circuits, such as frequency converters.

An obvious solution of this problem is to convert the frequency to a voltage which is supplied to a motor control amplifier of the aforementioned type which is provided with tacho negative feedback. However, the accuracy of such a system is poor. Furthermore, in some uses the temperature may have an excessive influence, and tolerances of component parts play important roles in the process of exact conversion of frequency to revolutions.

It is an object of the present invention to avoid the said disadvantages and to provide a pulse-to-revolution converter of the type described at the beginning of this specification which is characterized in that a negative-feedback loop is provided from a signal generator which is a coupled to the output shaft and supplies a shaft position signal to a switching device which is connected to the input of the converter and the output of which switches a correction signal source which supplies a correction signal to the pulse-frequency converter, the negative-feedback control being such that the instant at which a shaft position signal occurs lies within a repetition period of the input pulses.

The advantage of a pulse-to-revolution converter according to the invention is that from the output shaft a quantity is derived which exactly depicts the shaft position and compares it with the input pulse frequency, compelling the control circuit to adjust itself. The correction signal will be adjusted so that variations in the motor load, drift of values of the component parts of the frequency-to-voltage converter, of the correction signal generator, of the amplifier circuit, in the tacho signal generator and in the motor due to ageing or temperature variations are compensated for.

The invention is based on the recognition that, with proper proportioning, in a desired speed or frequency range the phase difference between the input frequency and the frequency of the shaft position signal per cycle may be utilized to control a correction control circuit capable of compensating for the aforementioned variations.

A preferred embodiment starts from a fixed correction quantity which in each cycle is supplied in the control circuit and provides synchronization by the duration of the time during which it is operative. For this purpose a pulse-to-revolution converter according to the invention is characterized in that the switching device is a flip-flop which is set to one state by the shaft position signal and to the other state by an input pulse, and in that the correction signal source includes a semiconductor switch which is controlled by the flip-flop and which switches a correction quantity into circuit and out of circuit, this correction quantity influencing the pulse-frequency converter.

The correction quantity may, for example, influence the timing circuit of the monostable multivibrator which is included in many known converters for converting a pulse frequency into a direct voltage or direct current. For example, a resistor may be connected in series or in parallel with the discharge resistor of a RC-combination in the timing circuit, or a discharge current source may have its value changed.

Alternatively, the circuit which has an integrating function for supplying the output direct voltage or direct current may be influenced by changing its charge circuit or discharge circuit.

It should be noted that the tacho-signal may be obtained in many known manners, for example by means of a tachogenerator coupled to the motor or to the output shaft, via an electronic subtraction circuit, as will be described hereinafter, by the use of a direct-current motor provided with permanent magnet energization which is connected as a generator for a short period, the voltage generated being stored, or by using the shaft position signal in conjunction with a frequency-to-voltage converter. The signal generator which determines the shaft position may also be of a known type: an apertured disk in conjunction with a lamp and a photocell, a ring of teeth in conjunction with an inductive pick-up, a magnet on the shaft in conjunction with a reed contact or a resistor sensitive to a magnetic field, while use may also be made of the commutation signal which can be derived from direct-current motors by means of brushes or Hall plates.

Figure 2:
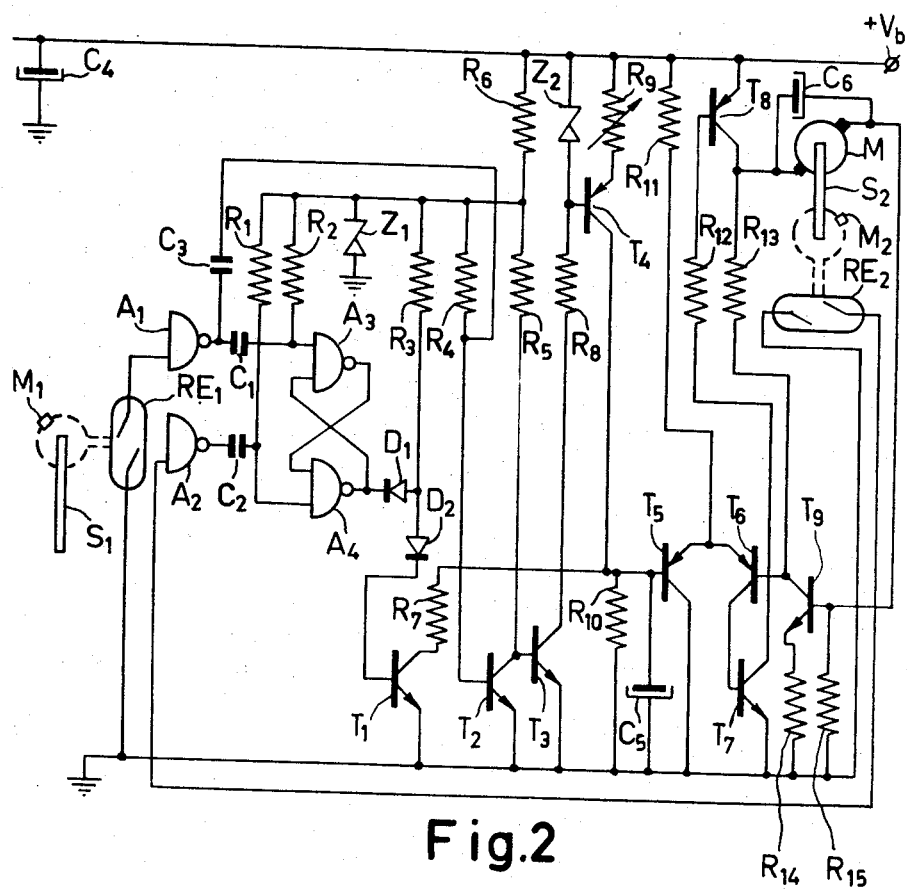

An embodiment of the invention will now be described, by way of example, with reference to the accompanying diagrammatic drawings, in which:

FIG. 1 is a block diagram of a pulse-to-revolution converter according to the invention, and FIG. 2 is a detailed circuit diagram of an electric shaft in which a pulse-to-revolution converter according to the invention is used.

Referring now to FIG. 1, a pulse train 18 is applied to an input terminal 1 of the pulse-to-revolution converter. This signal is fed to a converter 2 for converting a pulse frequency into a direct voltage and also to a switching device 13. The converter 2 delivers a direct-voltage signal the mean value of which is related to the repetition frequency of the pulse train 18. This direct-voltage signal is applied to a first input 4 of a comparator 3. To a second input 5 of this comparator there is applied through a lead 19 connected to a motor 9 a direct-voltage signal which is derived from the motor and the amplitude of which is proprtional to a number of revolutions, i.e. the speed of rotation, of a shaft 10 coupled to the rotor of the motor 9. The difference between the two signals at the inputs 4 and 5 produces a control signal at the output 6 of the comparator 3, which signal is applied to an amplifier supply circuit 7 which feeds the motor via an input 8, causing the motor to assume a given speed. In some uses a very compact unit is obtainable by using a direct voltage and a direct-current motor. The motor control, which comprises the comparator 3, the amplifier 7, the motor 9 and the tacho negative feedback loop 19, may also be suitable for an alternating voltage, in which case the control signal applied to the input 4 must have a suitable value and form.

A signal generator 11 provides a shaft position signal, i.e. a signal which is related to the rotation of the shaft 10 through a predetermined number of degrees. This signal is applied through a lead 20 to an input 12 of the switching device 13. The difference in frequency between the pulse train 18 applied to an input 14 and the shaft position signal applied to the input 12 provides a control signal which via a lead 15 is applied to a correction signal generator 16 which provides a correction signal to a control input 17 of the converter 2.

In a suitable embodiment the amplifier control circuit 3-7-9-19 may be adjusted so that, with the input 17 of the converter 2 being open-circuited, the motor 9 will run at too high a speed or at too low a speed. Hence, a correction signal must be applied to the input 17 which reduces or increases respectively the value of the control voltage to be applied to the input 4 of the comparator 3. This correction signal may have a constant value and a variable duration. The variable duration is obtainable by switching the correction signal by means of a switch which is operated by a bistable switching device 13 which changes state each time a pulse is applied to its input 14 and is reset each time a shaft position signal is applied to the input 12. Thus control is effected by phase shifting of the two signals at the inputs 12 and 14.

FIG. 2 shows a practical embodiment in which a shaft $S_2$ is required to run in synchronism with a shaft $S_1$. The shaft $S_1$ may be the propeller shaft of a motor car and the shaft $S_2$ may be coupled to a conventional speedometer-odometer commonly used in automobiles. Instead of the mechanical flexible cable an "electric shaft" coupling is obtained which has many known advantages, such as no mechanical wear and failure and freedom in the disposition of the component parts.

On the shaft $S_1$ is mounted a magnet $M_1$, which in a given shaft position closes a reed contact $RE_1$. As a result the level at the input of a logic circuit $A_1$, which is a NAND-gate, is changed from high to low. The gate $A_1$ is connected as a buffer to avoid current transients due to the contact $RE_1$, and the output of $A_1$ also changes from high to low. This activates a monostable circuit comprising a capacitor $C_3$, a resistor $R_4$ and a transistor $T_2$, which results in that the transistor $T_2$ is temporarily cut off. Consequently a transistor $T_3$ becomes conductive, because its base is enabled to draw current via the collector resistor $R_5$ of the transistor $T_2$ from a stabilized supply circuit comprising a Zener diode $Z_1$, a series resistor $R_6$ and a supply source $+V_b$. The temporary conductivity of the transistor $T_3$ activates the current source comprising a Zener diode $Z_2$, an emitter resistor $R_9$ and a transistor $T_4$. As a result, a fixed charge is supplied to a storage capacitor $C_5$ which has a discharge resistor $R_{10}$. Thus, the operation of the arrangement consists in that at each input pulse a fixed charge is supplied to the capacitor $C_5$ which can leak away through the resistor $R_{10}$, so that at the base of a transistor $T_5$ there is set up a voltage which is in a more or less proportional ratio to the pulse frequency.

A motor M has an output shaft $S_2$ to which is secured a magnet $M_2$ which in a given shaft position energizes a reed contact $RE_2$.

A comparator comprising transistors $T_5$ and $T_6$ which have a common emitter resistor $R_{11}$ compares the voltage across the capacitor $C_5$ with the collector voltage of a transistor $T_9$, which voltage is to be proved to be substantially equal to the electromotive force EMF which is produced by the direct-current motor itself and is proportional to the speed of the motor. The difference signal controls a transistor $T_7$ which in turn controls a power transistor $T_8$ the collector circuit of which includes the motor M and a series resistor $R_{15}$. The voltage across the motor is determined by:

$$V_{motor} = EMF + I_m R_m,$$

where $I_m$ is the motor current and $R_m$ is the internal resistance of the motor. The voltage across $R_{15}$ is:

$$I_m R_{15} = I_{T9} R_{14},$$

where $I_{T9}$ is the collector emitter current of the transistor $T_9$ and $R_{14}$ is its emitter resistor. The collector circuit of this transistor includes a resistor $R_{13}$, across which a voltage $I_{T9} R_{13}$ is set up.

The voltage between the collector of $T_8$ and earth is:

$$\underbrace{-I_{T9}R_{13}+V_{coll\,T9}}_{A}=EMF+\underbrace{-I_m(R_m+R_{15})}_{B}$$

If the term A is made equal to the term B, the collector voltage of $T_9$ actually is equal to the EMF of the motor and proportional to its speed. By substitution this condition becomes:

$$R_m = R_{15}\,R_{13} - R_{14}/R_{14}$$

This circuit comprising three resistors and one transistor provides the tacho-signal required in this pulse-to-revolution converter with a sufficient degree of accuracy.

The correction signal for exact synchronisation is supplied by an additional leakage resistor $R_7$ which is connected in parallel with a combination $R_{10} - C_5$ and which is switched into circuit and out of circuit by means of a transistor $T_1$. The transistor $T_1$ is rendered conductive by current supplied via a resistor $R_3$ and a diode $D_2$ when the diode $D_1$ is cut off owing to the output of a NAND gate $A_4$ being high. The latter is the case when the reed contact $RE_2$ is closed and, via a buffer $A_2$ and a differentiating circuit $R_1 C_2$, applies a trigger pulse to the gate $A_4$. NAND gates $A_3$ and $A_4$ form a flip-flop. When the next trigger pulse which is produced by a differentiating circuit $R_2 C_1$ and by the drop of the potential level at the output of the gate $A_1$ from high to low owing to the closure of the reed contact $RE_1$, is applied to the input of the gate $A_3$, the flip-flop $A_3 A_4$ changes state, the output of $A_4$ falls from a high level to a low level, the transistor $T_1$ is cut off and the leakage resistor $R_7$ is switched out of circuit.

In a practical embodiment control is effected in a pulse repetition frequency range between a few Hz and 60 Hz, and in each cycle the leakage resistor $R_7$ may provide a slope correction for the RC combination $R_{10}, C_5$ of between 5 percent and 15 percent, depending upon the motor and the motor load. In the said frequency range exact synchronization is effected not only when the frequency changes upwards or downwards, but also when the converter is suddenly switched to a given pulse frequency.

I claim:

1. A pulse frequency-to-revolution converter, comprising a motor having a rotational speed responsive to variations in input voltage and having an output shaft, an input pulse frequency-to-voltage converter for converting input pulses to voltage levels, a voltage supply circuit connecting the pulse frequency to voltage converter to the motor providing the motor with a voltage corresponding to the output of the pulse frequency-to-voltage converter, a tacho-signal negative feedback means connected between the motor and the supply circuit, a shaft position negative feedback loop connected to the motor shaft for providing pulses corresponding to the motor shaft position, a switching device connected to the shaft position negative feedback loop for providing shaft position switching signals, and a correction signal source connecting the switching device to the pulse frequency-to-voltage converter for providing correction signals to the pulse frequency-to-voltage converter in order to maintain the instant at which a shaft position signal occurs within a repetition period of the input pulses.

2. Pulse-to-revolution converter as claimed in claim 1, wherein the switching device is a flip-flop which is set to one state by the shaft position signal and to the other state by an input pulse, and in that the correction signal source includes a semiconductor switch which is controlled by the flip-flop and switches a correction means into and out of circuit, this correction means influencing the pulse frequency converter.

3. Pulse-to-revolution converter as claimed in claim 2, whereby the pulse frequency-to-voltage converter converts the pulse frequency into a direct voltage and includes a monostable multivibrator, characterized in that the correction means is connected to the timing circuit of the monostable multivibrator.

4. Pulse-to-revolution converter as claimed in claim 2, wherein the pulse frequency-to-voltage converter is a pulse frequency-to-direct voltage converter comprising a current source which is controlled at each input pulse for a fixed period of time, a parallel combination of a storage capacitor and a resistor connected to the current source, the correction means influencing the amplitude of the current from the current source.

5. Pulse-to-revolution converter as claimed in claim 2, wherein the pulse frequency-to-voltage converter comprises a pulse frequency-to-direct voltage converter, comprising a parallel combination of a storage capacitor and a discharge circuit across which the output direct voltage may be taken, the correction means comprising a resistor which influences the charge of the storage capacitor.

* * * * *

UNITED STATES PATENT OFFICE
CERTIFICATE OF CORRECTION

Patent No. 3,778,693      Dated December 11, 1973

Inventor(s) AART GERRIT KORTELING

It is certified that error appears in the above-identified patent and that said Letters Patent are hereby corrected as shown below:

Col. 1, line 42, after "is" cancel "a";

Col. 4, line 28, cancel the minus signs in the equation;

line 36, "$R_m = R_{15} R_{13} - R_{14}/R_{14}$" should read $$-- \quad R_m = R_{15} \frac{R_{13} - R_{14}}{R_{14}} \quad --.$$

Signed and sealed this 16th day of April 1974.

(SEAL)
Attest:

EDWARD M. FLETCHER, JR.
Attesting Officer

C. MARSHALL DANN
Commissioner of Patents